US007890674B2

(12) United States Patent
Spencer

(10) Patent No.: US 7,890,674 B2
(45) Date of Patent: *Feb. 15, 2011

(54) SYSTEM AND COMPUTER PROGRAM PRODUCT FOR DYNAMIC QUEUE SPLITTING FOR MAXIMIZING THROUGHPUT OF QUEUE BASED OPERATIONS WHILE MAINTAINING PER-DESTINATION ORDER OF OPERATIONS

(75) Inventor: William A. Spencer, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 12/361,609

(22) Filed: Jan. 29, 2009

(65) Prior Publication Data
US 2010/0191915 A1 Jul. 29, 2010

Related U.S. Application Data

(63) Continuation of application No. 11/459,726, filed on Jul. 25, 2006, now Pat. No. 7,493,428.

(51) Int. Cl.
G06F 3/00 (2006.01)
G06F 5/00 (2006.01)

(52) U.S. Cl. .......................................... 710/52; 710/57
(58) Field of Classification Search ....................... None
See application file for complete search history.

(56) References Cited

U.S. PATENT DOCUMENTS

| 7,254,654 | B1 * | 8/2007 | Davis et al. | 710/52 |
| 7,461,284 | B2 * | 12/2008 | Thompson et al. | 713/500 |
| 2005/0235080 | A1 * | 10/2005 | El-Batal | 710/74 |

* cited by examiner

Primary Examiner—Henry W Tsai
Assistant Examiner—Kris Rhu
(74) Attorney, Agent, or Firm—David A. Dagg

(57) ABSTRACT

A system for providing dynamic queue splitting to maximize throughput of queue entry processing while maintaining the order of queued operations on a per-destination basis. Multiple queues are dynamically created by splitting heavily loaded queues in two. As queues become dormant, they are re-combined. Queue splitting is initiated in response to a trigger condition, such as a queue exceeding a threshold length. When multiple queues are used, the queue in which to place a given operation is determined based on the destination for that operation. Each queue in the queue tree created by the disclosed system can store entries containing operations for multiple destinations, but the operations for a given destination are all always stored within the same queue. The queue into which an operation is to be stored may be determined as a function of the name of the operation destination.

17 Claims, 6 Drawing Sheets

SYSTEM AND COMPUTER PROGRAM PRODUCT FOR DYNAMIC QUEUE SPLITTING FOR MAXIMIZING THROUGHPUT OF QUEUE BASED OPERATIONS WHILE MAINTAINING PER-DESTINATION ORDER OF OPERATIONS

CROSS-REFERENCE TO RELATED APPLICATIONS

The present application is a Continuation under 35 U.S.C. 120 of commonly assigned prior U.S. application Ser. No. 11/459,726, filed Jul. 25, 2006 in the name of William A. Spencer, issued Feb. 17, 2009 as U.S. Pat. No. 7,493,428.

FIELD OF THE INVENTION

The present invention relates generally to queuing systems, and more specifically to a system and computer program product for providing dynamic queue splitting for maximizing throughput of queue based operations while maintaining order of operations.

BACKGROUND OF THE INVENTION

As it is generally known in computer science, a queue is a data structure in which entries (also known as "elements" or "items") are removed in the same order they were entered. Queue operation is often referred to as FIFO (first in, first out). The two basic operations associated with a queue are enqueue and dequeue. Enqueue means adding a new entry to the rear of the queue, while dequeue refers to removing the front item from queue. Queues are often used to store incoming service requests for systems that process those requests.

Many queue applications exist in which multiple operations for multiple destinations are placed into a single queue, and the order that the operations arrive at each destination must be the same as the order in which they were added to the queue. In other words, per-destination operation order must be preserved, such that operations for a given destination must be delivered to that destination in the order in which they were queued. For example, operations received from multiple sources and queued for delivery to multiple destination databases must be handled in this way. Per-destination operation order must also be maintained in the case of data replication operations within a distributed database and/or between members of a server cluster, and in other contexts.

Significant performance limitations may be encountered in terms of maximizing throughput when a single queue is used to pass operations from multiple sources to multiple destinations. These limitations often result from serial processing of queue entries, and the inability of existing systems to dynamically provide parallelization of queue entry processing.

For the above reasons and others, it would be desirable to have a new system for maximizing the throughput of queue processing steps in a queuing system, while at the same time maintaining per-destination order of operations with regard to operations passed from multiple sources to multiple destinations.

SUMMARY OF THE INVENTION

To address the above described and other shortcomings of previous solutions, a system is disclosed for providing dynamic queue splitting to maximize throughput of queue entry processing, while maintaining the order of queued operations on a per-destination basis. In order to parallelize the processing of queued operations, the disclosed system dynamically creates multiple queues by splitting heavily loaded queues into two. Likewise, as queues become dormant, the disclosed system re-combines them to minimize queue handling overhead. These dynamic adjustments focus parallelization on parts of a queue tree that are heavily loaded at a given time, make re-adjustments as the load shifts to other parts of the queue tree, and minimize overhead in areas of the queue tree that are not heavily used.

The queue splitting provided by the disclosed system is initiated in response to a trigger condition regarding a given queue. For example, if a queue is exceeding a predetermined threshold length, that queue may be selected for splitting. Such a condition may, for example, arise when there is a relatively large amount of activity for one destination, causing the queue to back up and increase in length, while at the same time operations queued for another destination are having to wait for their turn to be delivered because of all the activity for the other destination. Similarly, if entries within a given queue or for a given destination are not being processed at a rate that meets a quality of service requirement, that might result in a queue being selected for splitting.

Since operations for a destination must arrive at that destination in the order that they were originally queued, the disclosed system ensures that all operations for a given destination are kept in the same queue. Accordingly, when more than one queue is used, the disclosed system determines the queue in which to place a given operation based on the destination for that operation. Each queue in the queue tree created by the disclosed system can store entries containing operations for multiple destinations, but the operations for a given destination are all always stored within the same queue.

The queue into which an operation is to be stored may be determined by applying a function to the name of the destination for the operation. In this embodiment, each destination is represented as an invariant numerical value derived as a function of the destination name or label—$f(\text{Destination})$. This ensures that all operations for a given destination are always in the same queue and thus guarantees that they will be delivered to that destination in the same order in which they were enqueued.

In one embodiment, in order to determine which of two queues in a branch of a queue tree should receive an operation, the disclosed system examines a bit of the $f(\text{Destination})$ value for the destination of the operation. Just as a single queue may be split into two new queues, if one of the two new queues starts backing up, the disclosed system may further split that queue into two more additional queues. In order to determine which of the two additional queues in the resulting queue tree sub-branch in which to place a given operation, the disclosed system uses two bits of the $f(\text{Destination})$ value. This process may continue such that each queue in the queue tree may be split into two new queues if its performances falls below a threshold level, and successively more bits from the $f(\text{destination})$ are used to determine the specific queue into which a given operation should be placed as the depth of the queue tree increases.

The disclosed system applies to any queuing implementation where multiple operations for multiple destinations are being placed into a single queue, and where the order that the operations arrive at each destination must be in the same as the order in which they were originally queued. The disclosed system optimizes the queue entry processing overhead involved in dequeuing, processing and sending each enqueued operation to a destination by processing the operations in parallel.

By overlapping the processing of multiple queued operations, the disclosed system decreases the serial nature of queue entry processing, and decreases the average wait time for an enqueued operation to be processed. By processing more than one queued operation at a time, increased parallelism is achieved, speeding up the end to end time each operation spends in the queuing system, resulting in more operations processed per second.

Thus there is disclosed a new system for maximizing throughput of queue processing steps in a queuing system, while maintaining per-destination order of operations with regard to operations passed from multiple sources to multiple destinations.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
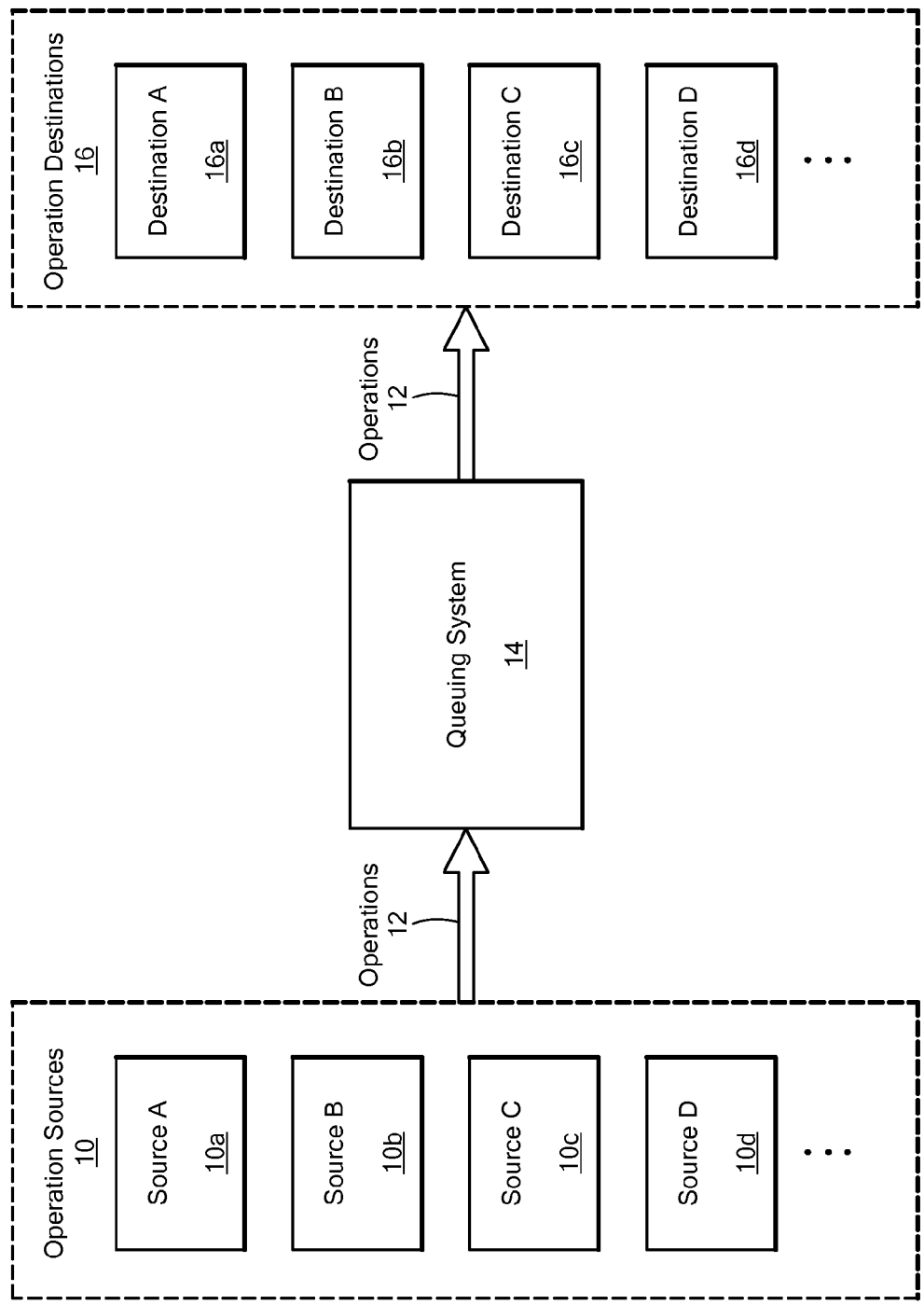
FIG. 1 is a logical block diagram showing components in an illustrative embodiment of the disclosed system.

FIG. 1 is a logical block diagram showing components in an illustrative embodiment of the disclosed system. As shown in FIG. 1, Operation Sources 10, shown for purposes of illustration including Source A 10a, Source B 10b, Source C 10c, Source D 10d, etc., produce Operations 12 to a Queueing System 14. The Queuing System 14 stores Operations 12 until they are consumed by Operation Destinations 16, shown for purposes of illustration including Destination A 16a, Destination B 16b, Destination C 16c, Destination D 16d, etc. Each of the Operations 12 is destined for one of the Operation Destinations 16, and is consumed by that single destination when it is removed from the Queuing System 14. As described further below, the Queueing System 14 includes one or more queues organized into a dynamically configured queue tree.

The Operation Sources 10 may include any specific kind of software and/or hardware system that produces operations. For example, the Operation Sources 10 may include, but are not limited to, client systems that issue request or command operations to server systems within the Operation Destinations 16, peer systems that issue operations to other peers within the Operation Destinations 16, server systems that issue operations to other server systems contained in the Operation Destinations 16, and/or other types of systems. The types of operations generated by the Operation Systems 10 may include database operations or any other specific type of operation. The Operations 12 may include replication operations performed as part of a distributed database or server cluster, and/or any other specific type of operation. Each of the Operation Destinations 16 may provide or utilize software handler processes or the like for dequeuing operations from the Queuing System 14. Such handler processes may, for example, be dynamically instantiated to process operations contained on each queue within the Queuing System 14.

The Operation Sources 10, Operation Destinations 16 and Queuing System 14 of FIG. 1 are communicably connected, for example by way of a communication network such as the Internet, a Local Area Network (LAN), or other specific type of communication system or network. The Operation Sources 10 and Operation Destinations 16 may, for example, each consist of computer systems including at least one processor, program storage, such as memory, for storing program code executable on the processor, and one or more input/output devices and/or interfaces, such as data communication and/or peripheral devices and/or interfaces. The Operation Sources 10 and Operation Destinations 16 may each further include appropriate operating system software. The Queuing System 14 may, for example, be made up of software and/or hardware located either partially or completely within a separate computer system also having other components similar to the Operation Sources 10 or Operation Destinations 16, and/or as software and/or hardware contained partially or completely within one or more of the Operation Sources 10 and/or Operation Destinations 16.

Figure 2:
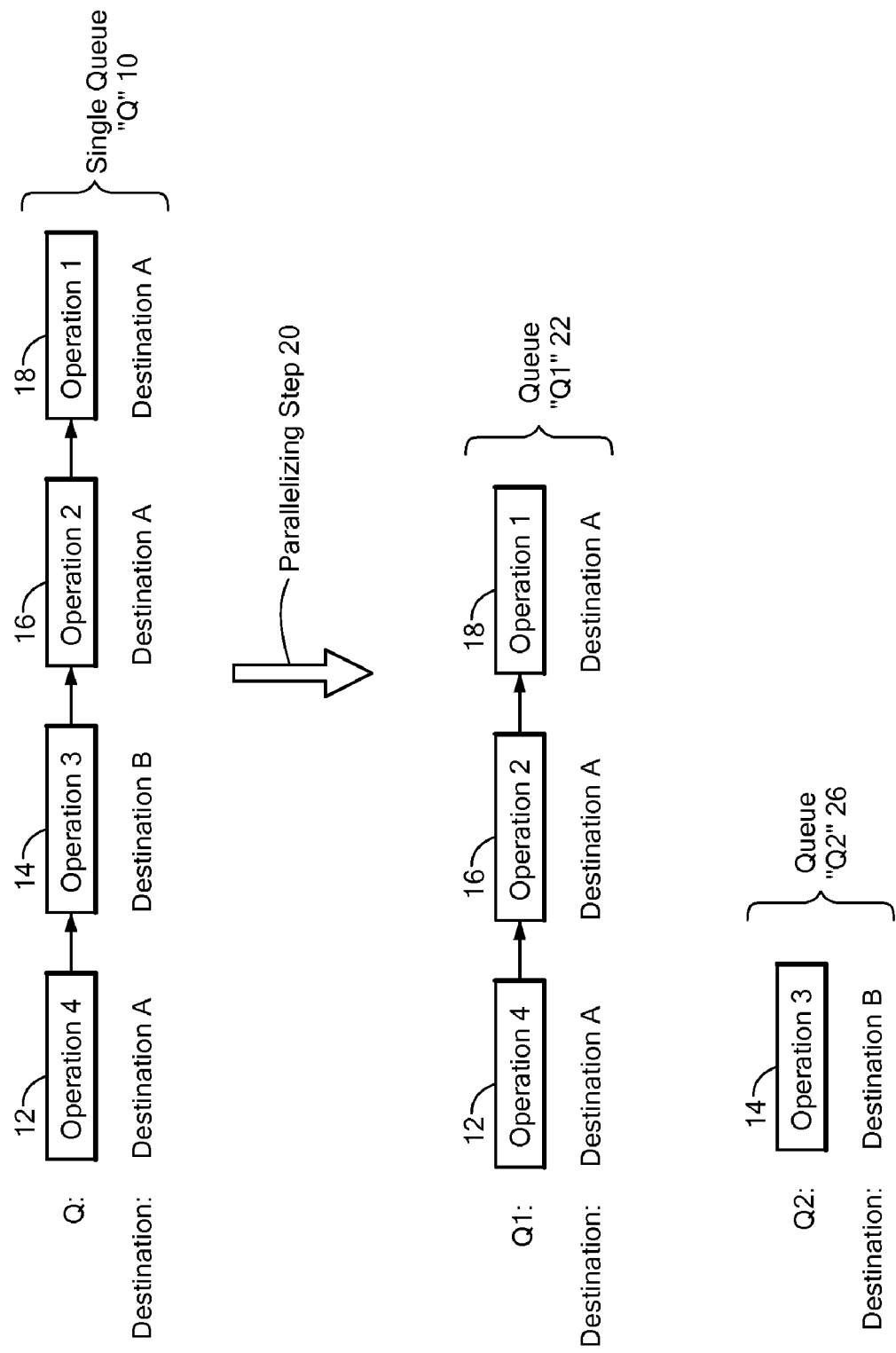
FIG. 2 is a logical block diagram showing parallelizing a queue into two queues as performed during operation of an illustrative embodiment of the disclosed system.

FIG. 2 is a logical block diagram showing parallelizing a queue into two queues as performed during operation of an illustrative embodiment of the disclosed system. In the queue examples of FIG. 2 and the other figures, the head of each queue is generally shown on the left hand side, and is where new operations are added or "enqueued", while the tail of each queue is shown on the right hand side, and is where queued operations are removed or "dequeued" by the operation destinations they are associated with.

As shown in FIG. 2, operations can be parallelized between two destinations, for example a Destination A and a Destination B. In the original Single Queue "Q" 10, an Operation 4 12 is associated with Destination A, Operation 3 14 is associated with Destination B, Operation 2 16 is associated with Destination A, and Operation 1 18 is associated with Destination A. After a determination that the Single Queue "Q" 10 is heavily loaded, a Parallelizing Step 20 is performed, resulting in creation of the Queue "Q1" 22 and the Queue "Q2" 24. As shown in FIG. 2, the Queue "Q1" 22 includes Operation 4 12, Operation 2 16 and Operation 1 18, all of which are associated with Destination A. The order of Operation 4 12, Operation 2 16 and Operation 1 18 is the same as in the original Single Queue "Q" 10. Subsequently received operations associated with Destination A are enqueued to Queue "Q1" 22 in the order that they are received. The Queue "Q2" 24 includes all those operations from the original Single Queue "Q" 10 that are associated with Destination B, in this case only Operation 3 14. Subsequently received operations associated with Destination B are enqueued to Queue "Q1" 22 in the order that they are received.

Figure 3:
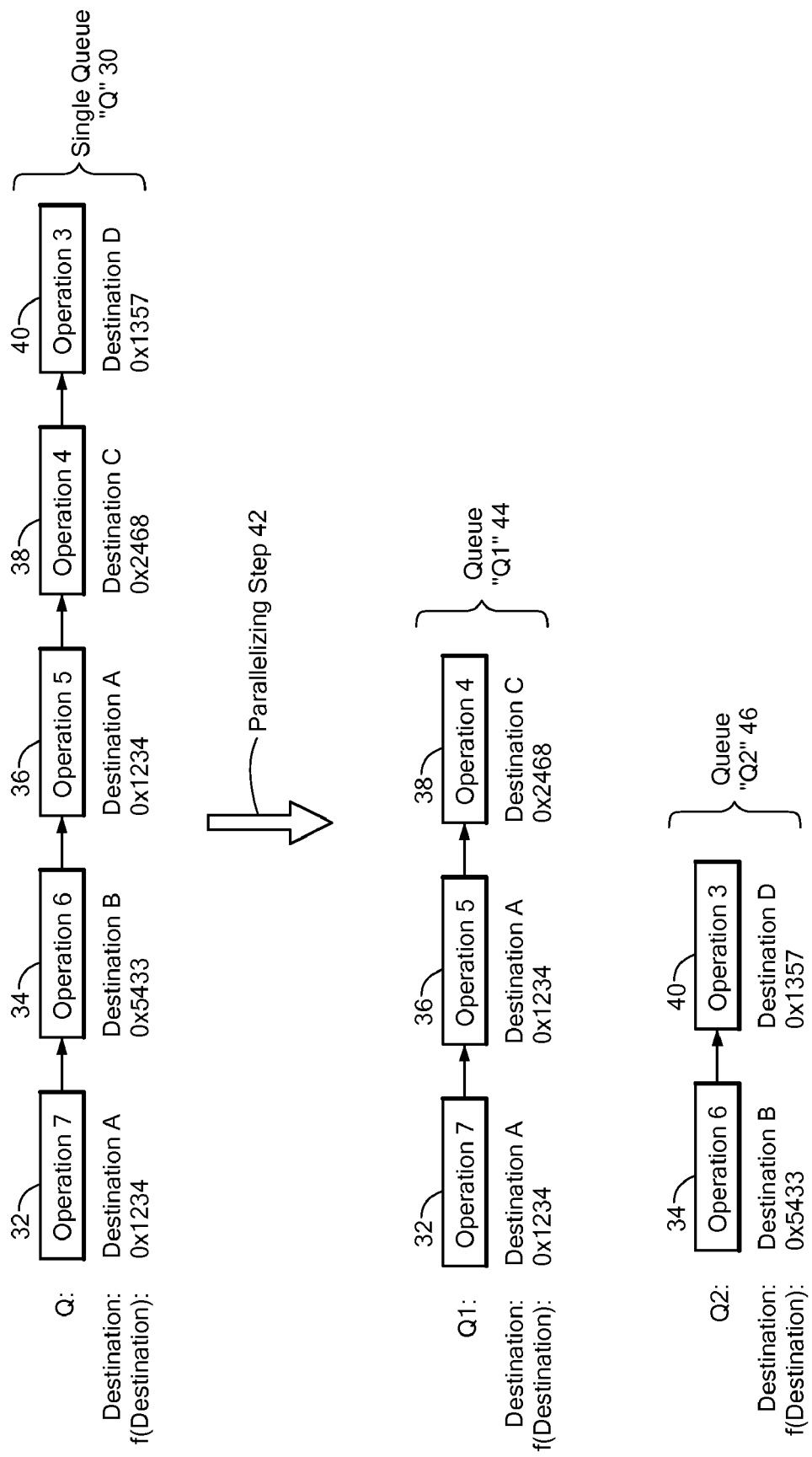
FIG. 3 is another logical block diagram showing parallelizing a queue into two queues as performed during operation of an illustrative embodiment of the disclosed system.

FIG. 3 is another logical block diagram showing parallelizing a queue into two queues as performed during operation of an illustrative embodiment of the disclosed system. As shown in FIG. 3, the disclosed system can be embodied to dynamically split and combine queues to maximize throughput to more than two destinations. In the example of FIG. 3, an embodiment of the disclosed system begins operation with a Single Queue "Q" 30. As Single Queue "Q" 30 starts backing up beyond a predetermined threshold size, the disclosed system determines that splitting Single Queue "Q" 30 into two queues becomes beneficial from a parallel processing perspective. As a result of this determination, the Single Queue "Q" 30 is split into two queues, shown for purposes of illustration as Queue "Q1" 44 and Queue "Q2" 46. All entries from the original Queue "Q" 30 are moved to two new queues "Q1" 44 and "Q2" 46. In one embodiment, once the queue "Q" 30 is split, two new handler threads are started to process operations from each of the resulting queues "Q1" 44 and "Q2" 46. Operations that were previously queued to "Q" 30 and associated with Destinations A, B, C and D, and all subsequently received operations associated with Destinations A, B, C and D, are thus queued to the two new queues "Q1" 44 and "Q2" 46.

In one embodiment of the disclosed system, in order to determine which of the two new queues "Q1" 44 and "Q2" 46 should receive an operation for a given destination, a function is applied to the destination name. This function is referred to herein for purposes of explanation as "$f$(Destination)". The value returned by $f$(Destination) indicates which queue an operation associated with the destination named "Destination" should be queued to. In one embodiment, a predetermined bit, such as the low bit of the $f$(Destination) value is used to indicate the correct queue for operations associated with "Destination". The function $f$(Destination) ensures that all operations for a given destination are always queued to the same queue, thus guaranteeing that operations are received and processed at that destination in the same order that they were placed into an original queue that was split, or in which they were received for queuing subsequent to the original queue being split. The function $f$(Destination) allows operations for multiple destinations to be queued to a single queue, but operations for a given destination are always queued to one and only one queue.

In the example of FIG. 3, Operation 7 32 and Operation 5 36 are associated with Destination A, and accordingly both have an associated $f$(Destination) value of 0x1234 (all "0x" values are hexadecimal notation, with each digit representing four bits). Operation 6 34 is associated with Destination B, and has an associated $f$(Destination) value of 0x5433. Operation 4 38 is associated with Destination C, and has an $f$(Destination) value of 0x2468. Operation 3 40 is associated with Destination D, and has an $f$(Destination) value of 0x1357. After the Parallelizing Step 42, Queue "Q 1" 44 stores all operations for which the value of $f$(Destination) has a clear least significant bit. As a result, Queue "Q1" 44 stores all operations associated with Destinations A and C. Also after the Parallelizing Step 42, Queue "Q2" 46 stores all operations for which the value of $f$(Destination) has a set least significant bit. As a result, Queue "Q2" 46 stores all operations associated with Destinations B and D.

Figure 4:
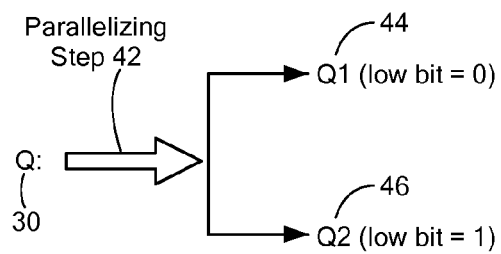
FIG. 4 is a block diagram showing a queue tree as generated by an illustrative embodiment of the disclosed system.

FIG. 4 is a block diagram showing a queue tree as generated by an illustrative embodiment of the disclosed system. The Queue Tree 50 shown in FIG. 4 diagrammatically represents the queues shown in FIG. 3. Accordingly, the Queue Tree 50 includes the Single Queue "Q" 30, and the two new queues "Q1" 44 and "Q2" 46. As indicated in FIG. 4, "Q1" 44 is used to queue operations associated with $f$(Destination) values in which the low bit is 0, while "Q2" 46 is used to queue operations associated with $f$(Destination) values in which the low bit is 1.

Figure 5:
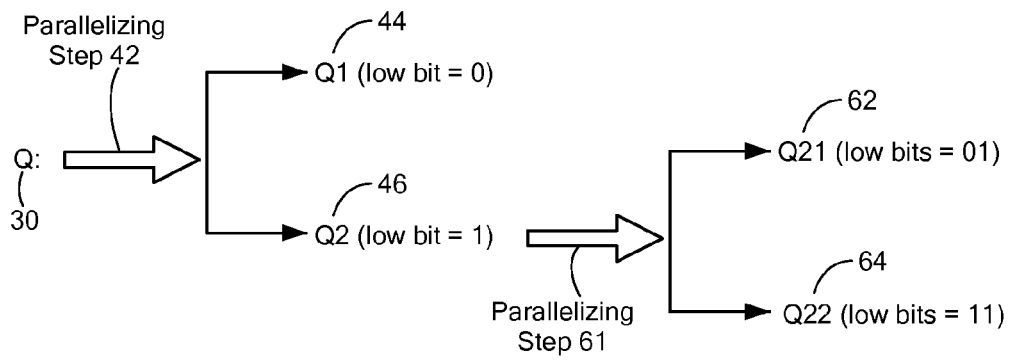
FIG. 5 is another block diagram showing a queue tree as generated by an illustrative embodiment of the disclosed system.

FIG. 5 is another block diagram showing a queue tree as generated by an illustrative embodiment of the disclosed system. FIG. 5 illustrates how an embodiment of the disclosed system operates to split previously generated new queues if those new queues are determined to be heavily loaded. As shown in the Queue Tree 60 of FIG. 5, just as the queue "Q" 42 was split into new queues "Q1" 44 and "Q2" 46 by the Parallelizing Step 42, queue "Q2" 46 may subsequently be split. For example, if "Q2" 46 is determined to be heavily loaded, for example because its length exceeds a predetermined threshold, then "Q2" 46 may be split into "Q21" 62 and "Q22" 64 in Parallelizing Step 61. In one embodiment, additional handler threads would be started as the additional queues "Q21" 62 and "Q22" 64 were created, in order to dequeue and process operations on those queues. After the Parallelizing Step 61, in order to determine which queue to place operations in, the disclosed system uses the lowest two bits of the $f$(Destination) value. Specifically, as shown for purposes of explanation in the example of FIG. 5, those operations associated with $f$(Destination) values in which the two low bits are 01 are queued to the additional queue "Q21" 62, while those operations associated with $f$(Destination) values in which the two low bits are 11 are queued to the additional queue "Q22" 64. Thus the disclosed system may be embodied such that the queue tree it creates can be traversed to determine a queue on which to enqueue an operation by using a different bit of the $f$(Destination) value for the destination associated with the operation at each level of the queue tree to determine which branch to take.

Using the disclosed system, queue splitting can continue. For example, queue "Q22" could be split into additional new queues "Q221" and "Q222" (not shown) up to an appropriate level supported by a given embodiment.

In order to support placing received operations onto the correct queues in the queuing system provided by the disclosed system, internal data structures must be maintained. These internal data structures allow the disclosed system to determine which queues have been split, and to traverse the current queue tree using the bits of the $f$(Destination) value to determine which queue an operation should be enqueued to.

Since each queue in the queue tree results in overhead being incurred for managing the queue and associated parallel processing, queue splitting is only beneficial under circumstance where such overhead is substantially offset by increased parallelism. In the event that the rate of operations for a previously active queue slows down sufficiently, that queue can be combined with another queue in the same way that they were previously split. For example, in the example of FIG. 5, if "Q21" 62 and "Q22" 64 were both determined to be below a low activity threshold for some predetermined period of time, then those two queues would be recombined into a single queue "Q2" 46.

The following constants, global variable, data structures, and function descriptions are provided for purposes of further explanation of an embodiment of the disclosed system, and could be used by such an embodiment to manage the queue splitting. Those skilled in the art will recognize that an application using such an embodiment of the disclosed is responsible for protecting the various queues via some kind of locking mechanism.

Constants:

MAXIMUM_QUEUE_DEPTH is the maximum depth of the queue splitting supported by an implementation. The maximum number of queues would be 2 to the MAXIMUM_QUEUE_DEPTH power. For example:

| MAXIMUM_QUEUE_DEPTH | Maximum Queues |
|---|---|
| 2 | 4 |
| 8 | 256 |

SPLIT_THRESHOLD is the threshold number of queue entries in a given queue which, if exceeded, will cause that queue to be split.

COMBINE_THRESHOLD is the threshold number of queue entries which will cause two queues to be re-combined with each other if the number of entries in each of the previously split queues drops below COMBINE_THRESHOLD for a predetermined period of time.

SECONDS_UNTIL_COMBINE is the number of seconds that two queues must have a number of entries below the COMBINE_THRESHOLD before they are combined.

Global variable:
QUEUE *QueueRoot is the root of the queue tree.

Data structures:
As an overview with regard to the below data structure descriptions, Queue structures QUEUE and QUEUE_EN-TRY are intended to be in-memory data structures. The QueueRoot is the root of the queue tree. If there are sub queues at a given point in the queue tree, then there is a fork or split in the queue tree at that point, QueueRoot.Queue1 and QueueRoot.Queue2 will be non-zero, and QueueRoot Queue1 and QueueRoot Queue2 will point to the QUEUE structures for the left and right hand side of the queue tree. Each of these QUEUE entries will either be a fork such that Queue1 and Queue2 are non-zero and point to the sub queue, or a queue such that Queue1 and Queue2 will be zero. Accordingly, the following data structure descriptions are provided for purposes of explanation:

| | |
|---|---|
| QUEUE structure | One of these structures is used per queue. |
| QUEUE_ENTRY *PtrHead | This is a pointer to the head of the queue or 0 if the queue is empty. |
| QUEUE_ENTRY *PtrTail | This is a pointer to the tail of the queue, and has a value of 0 if the queue is empty. |
| QUEUE *Queue1 | This is a pointer to a lower split queue with corresponding bit of f(Destination) = 0, or 0 if this queue is not split. If non-zero, this QUEUE structure is a link to two sub-queues, and PtrHead, PtrTail, NumEntries should all be 0. |
| QUEUE *Queue2 | Pointer to lower split queue with corresponding bit of f(Destination) = 1, or 0 if this queue is not split. If non-zero, this QUEUE structure is just a link to two sub-queues, and PtrHead, PtrTail, NumEntries should all be 0. |
| DWORD NumEntries | The number of entries in the queue. |
| TIME LastAboveCombineThreshold | The time when the queue depth was last above the COMBINE_THRESHOLD or 0 if never above COMBINE_THRESHOLD. |
| QUEUE_ENTRY structure | |
| QUEUE_ENTRY *Next | Link to the next entry in the queue or 0 if this is at the end of the queue. |
| char *DestName | Destination name. Alternatively, or in addition, representations other than strings, such as unique numbers, may used to represent queue entry destinations. For example, to accommodate representations, a definition such as VOID *DestName may be used. In another exemplary embodiment, DEST *DestName would be used, where DEST is a representation of the destination, such as a unique number assigned to the destination, or a unique string such as the destination name. |
| DWORD DestValue | f(Destination) - used to walk the queue tree. |
| {...} | Application specific data. |

Figure 6:
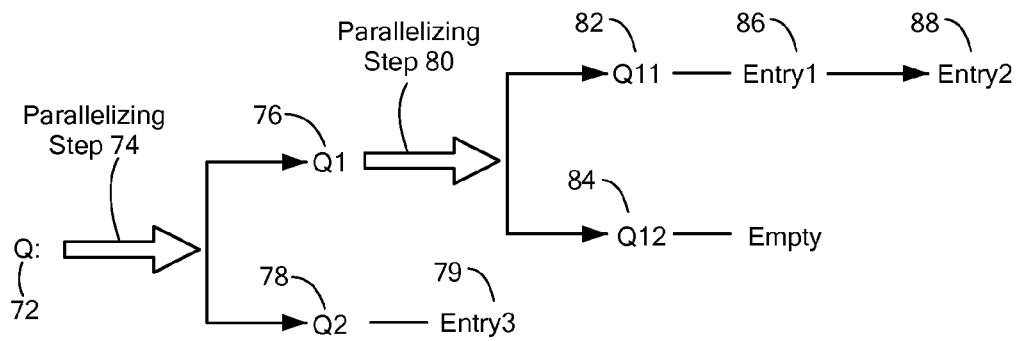
FIG. 6 is another block diagram showing a queue tree as generated by an illustrative embodiment of the disclosed system.
Figure 7:
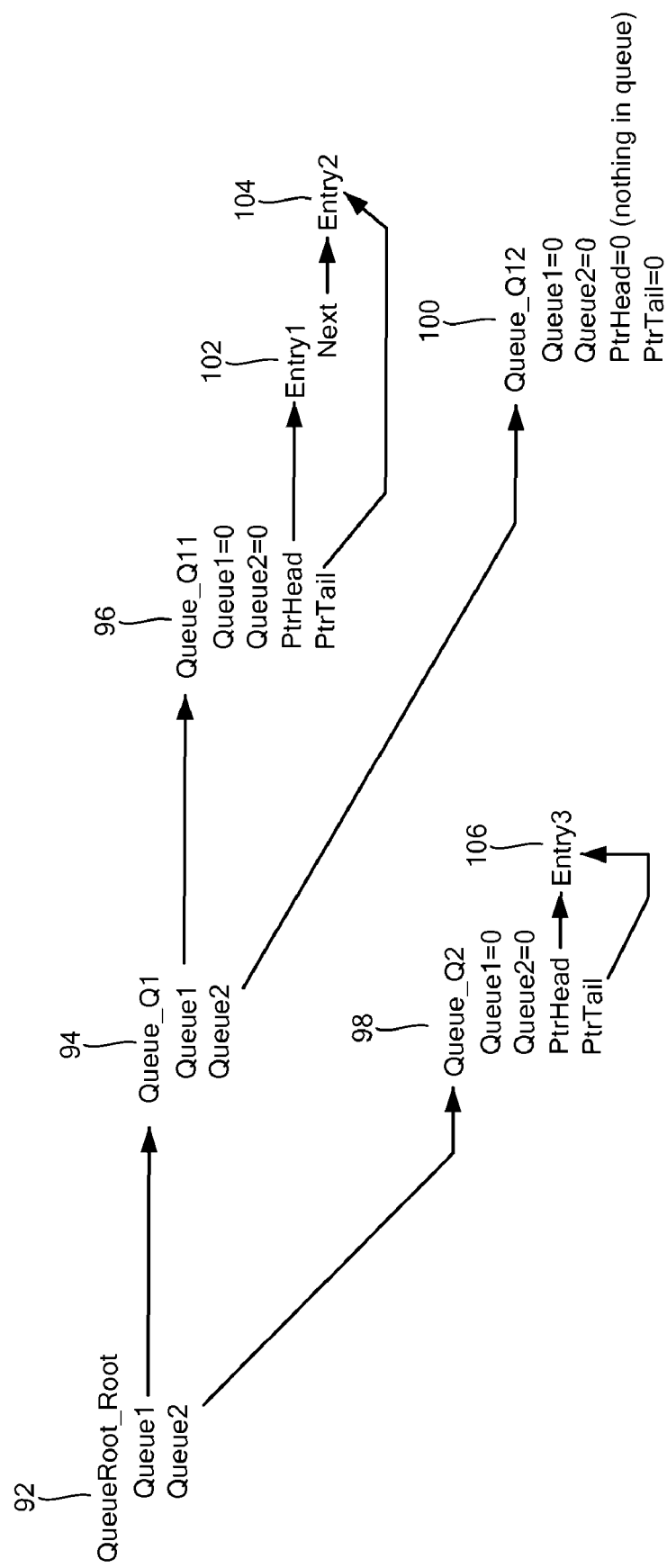
FIG. 7 is a block diagram showing software data structures corresponding to the queue tree of FIG. 6.

FIGS. 6 and 7 provide an illustrative example with reference to an embodiment using the above constant, global variable, and structure descriptions. A diagrammatic representation of a Queue Tree 70 in FIG. 6 includes a queue "Q" 72 that has been split in Parallelizing Step 74 into queues "Q1" 76 and "Q2" 78. The queue "Q1" 76 has been split into two queues "Q11" 82 and "Q12" 84 by Parallelizing Step 80. Queue "Q11" 82 is shown including entries "Entry1" 86 and "Entry2" 88. Queue "Q12" 84 is shown as empty, and Queue "Q2" 78 is shown including an entry "Entry3" 79.

FIG. 7 is a block diagram showing examples of software data structures corresponding to the queue tree 70 of FIG. 6. As shown in FIG. 7, a "QueueRoot_Root" QueueRoot structure 92 corresponds to the queue "Q" 72 in FIG. 6, and represents an initial fork in the queue tree. QueueRoot_

Root.Queue1 points to the QUEUE structure "Queue_Q1" 94 corresponding to the queue "Q1" 76 of FIG. 6. "Queue_Q1" 94 represents another fork in the queue tree, and Queue_Q1.Queue1 points to QUEUE structure "Queue_Q11" 96 (corresponding to the queue "Q11" 82 in FIG. 6), and Queue_Q1.Queue2 points to QUEUE structure "Queue_Q12" 100 (corresponding to the queue "Q12" 84 in FIG. 6). "Queue_Q11" 96 is a QUEUE structure that represents a queue that has not been split (corresponding to queue "Q11" 82 of FIG. 6), and accordingly Queue_Q11.Queue1 and Queue_Q11.Queue2 equal 0. Queue_Q11.PtrHead points to QUEUE_ENTRY "Entry1" 102 ("Entry1" 86 in FIG. 6), and Queue_Q11.PtrHead.Entry1.Next points to QUEUE_ENTRY "Entry2" 104 ("Entry2" 88 in FIG. 6).

QUEUE structure "Queue_Q12" 100 corresponds to queue "Q12" 84 in FIG. 6, and represents a queue that has not been split. Accordingly, Queue_Q12.Queue1 and Queue_Q12.Queue2 equal zero. "Queue_Q12" 100 also represents a queue that is empty, so Queue_Q12.PtrHead equals 0.

QUEUE structure "Queue_Q2" 98 corresponds to queue "Q2" 78 in FIG. 6, and represents a queue that has not been split. Accordingly, Queue_Q2.Queue1 and Queue_Q2.Queue2 equal zero. Queue_Q2.PtrHead points to QUEUE_ENTRY "Entry3" 106 (corresponding to "Entry3" in FIG. 6). Since "Entry3" 106 is also the last entry in "Queue_Q2" 98, Queue_Q2.PtrTail also points to "Entry3 106".

A number of function descriptions are now described for an exemplary embodiment. The below functions may be used in conjunction with the above provided constant, global variable, and structure definitions in an embodiment of the disclosed system, in order generate, traverse, and modify a queue tree.

Figure 8:
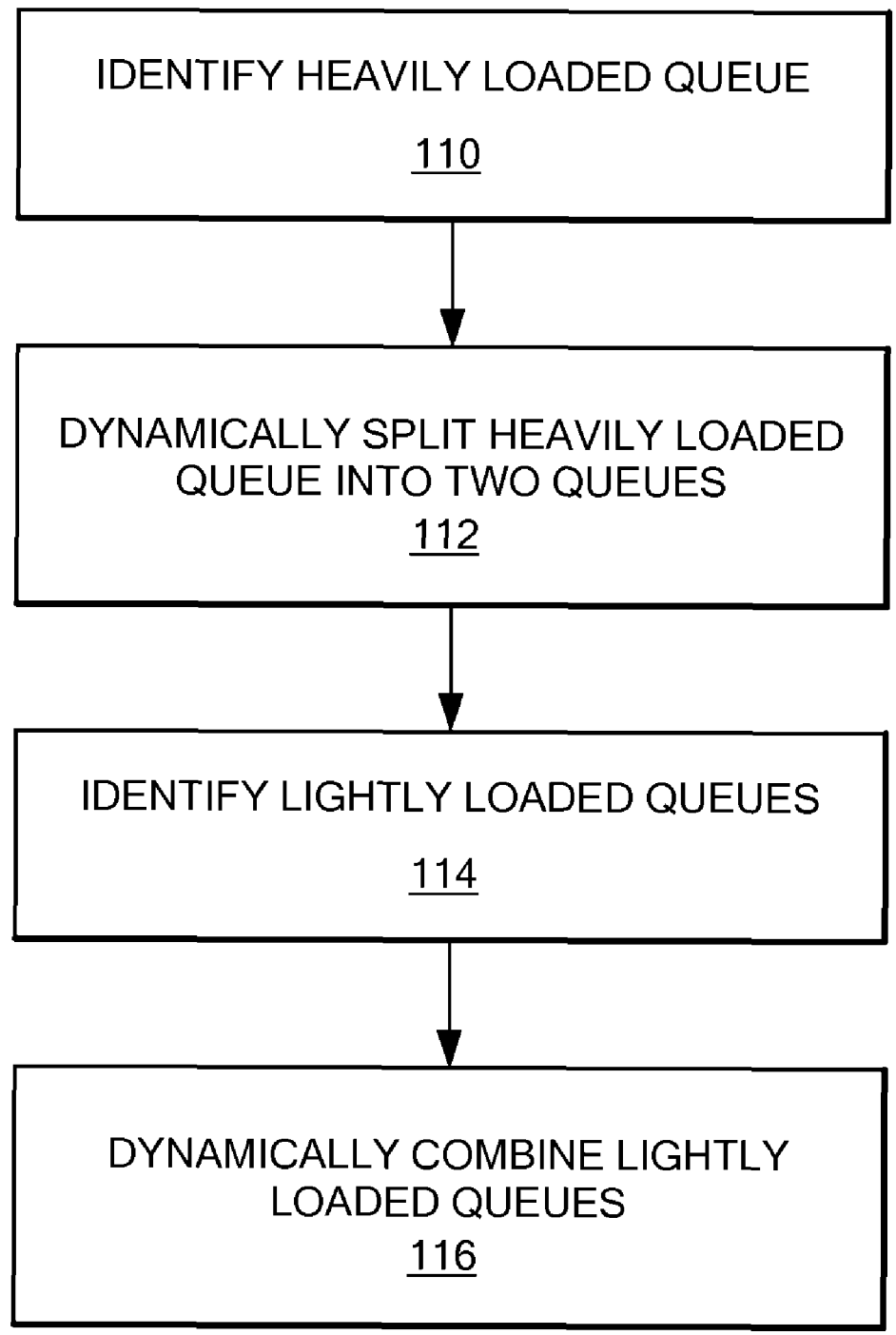
FIG. 8 is a flow chart showing steps performed by an illustrative embodiment of the disclosed system.

Functions:

FIG. 8 is a flow chart showing steps performed by an illustrative embodiment of the disclosed system. At step 110, the disclosed system operates to identify a heavily loaded queue, for example through a function operating as the ManageQueues( ) function described above traversing a queue tree. Any queues in the queue tree exceeding a predetermined threshold are determined to be heavily loaded, and at step 112 the disclosed system operates to dynamically split such heavily loaded queues each in to two new queues, for example by way of a function such as the SplitQueue(QUEUE *queue) function described above.

Also as shown in FIG. 8, the disclosed system at step 114 determines if there are currently any lightly loaded queues that can be recombined. Step 114 may, for example, be performed using a function such as the ManageQueues( ) function described above. Any previously split pairs of queues that are determined to be lightly loaded are then dynamically re-combined at step 116, for example by way of a function such as the CombineQueue(QUEUE *parent) function described above.

The disclosed system provides a number of advantages over previous solutions. For example, the dynamic queue splitting and combining performed by the disclosed system allows for dynamic adaptation of queues to match activity in the operation destinations, thus maximizing throughput and minimizing delay of queued operations, while maintaining the order of operations for individual destinations.

The disclosed system can take the form of an entirely software embodiment, an entirely hardware embodiment, or an embodiment containing both software and hardware elements. The figures include block diagram and flowchart illustrations of methods, apparatus(es) and computer program products according to an embodiment of the invention. It will

| | |
|---|---|
| EnQueue(QUEUE_ENTRY *entry) | This function locates the correct queue and queues the QUEUE_ENTRY structure to the correct queue. This function uses the DestValue in the QUEUE_ENTRY structure to walk the queue tree. It walks down the queue tree from QueueRoot_Root until it can go no further, (no more splits). At that point is located the queue into which the entry is enqueued. |
| DeQueue(QUEUE *queue, QUEUE_ENTRY **entry) | This function dequeues a queue entry from the specified queue and returns the queue entry to the caller. |
| ManageQueues( ) | This function traverses the queues in the queue tree. For example, this function may be called either from a time based routine, or may be called from EnQueue and/or DeQueue. If any queue in the queue tree is larger than SPLIT_THRESHOLD, that queue will be split by this function. If any two split queues have had lengths under COMBINE_THRESHOLD for SECONDS_UNTIL_COMBINE time, then this function combines them such that all entries in the two split queues will be re-queued to the parent queue and the split queues removed. |
| SplitQueue(QUEUE *queue) | This function splits QUEUE into 2 sub-queues. All entries currently in QUEUE are Dequeued from queue and distributed to queue.Queue1 and queue.Queue2. |
| CombineQueue(QUEUE *parent) | This function combines Queue1 and Queue2 into the parent queue. All entries from Queue1 and Queue2 will be moved to the parent queue, and Queue1 and Queue2 will be removed (set to zero). | be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory, that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms using various types of computer-readable media; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

I claim:

1. A system including at least one processor communicably coupled to a non-transitory computer readable medium, said computer readable medium having program code stored thereon for improving queue entry processing between a plurality of operation sources and a plurality of operation destinations, said program code comprising:
   program code for detecting a heavily loaded queue stored in said computer readable medium;
   program code for, responsive to said detecting said heavily loaded queue, dynamically splitting said heavily loaded queue into two new queues stored in said computer readable medium; and
   program code for maintaining a delivered order of queued operations on a per-destination basis by
      queuing previously queued operations destined for a first subset of said operation destinations onto a first one of said two new queues in an order in which said previously queued operations destined for said first subset of said operation destinations were previously queued in said heavily loaded queue, and
      queuing previously queued operations destined for a second subset of said operation destinations onto a second of said two new queues in an order in which said previously queued operations destined for said second subset of said operation destinations were previously queued in said heavily loaded queue.

2. The system of claim 1, wherein said program code for maintaining delivered order of queued operations on a per-destination basis further comprises:
   program code for queuing newly received operations destined for said first subset of said operation destinations onto said first one of said two new queues in an order in which said newly received operations destined for said first subset of said operation destinations are received; and
   program code for queuing newly received operations destined for said second subset of said operation destinations onto said second one of said two new queues in an order in which said newly received operations destined for said second subset of said operation destinations are received.

3. The system of claim 2, said program code stored on said computer readable medium further comprising:
   program code for detecting that a first one of said two new queues is heavily loaded;
   program code for, responsive to said detecting that said first one of said two new queues is heavily loaded, dynamically splitting said first one of said two new queues into two additional new queues; and
   program code for maintaining a delivered order of queued operations on a per-destination basis by
      queuing previously queued operations from said first one of said two new queues and destined for a third subset of said operation destinations onto a first one of said additional new queues in an order in which said previously queued operations destined for said third subset of said operation destinations were previously queued in said first one of said two new queues, and
      queuing previously queued operations from said first one of said two new queues and destined for a fourth subset of said operation destinations onto a second of said additional new queues in an order in which said previously queued operations destined for said fourth subset of said operation destinations were previously queued in said first one of said two new queues.

4. The system of claim 3, wherein said program code for maintaining delivered order of queued operations on a per-destination basis further comprises:
   program code for queuing newly received operations destined for said third subset of said operation destinations onto said first one of said additional new queues in an order in which said newly received operations destined for said third subset of said operation destinations are received; and
   program code for queuing newly received operations destined for said fourth subset of said operation destinations onto said second one of said additional new queues in an order in which said newly received operations destined for said fourth subset of said operation destinations are received.

5. The system of claim 4, said program code stored on said computer readable medium further comprising:
   program code for applying a function to a destination name associated with at least one operation to determine a target queue onto which to enqueue said at least one operation, wherein a first value of a first predetermined bit in a value of said function applied to said destination name indicates said target queue is a second one of said two new queues, and wherein a second value of said first predetermined bit in said value of said function applied to said destination name indicates said target queue is one of said additional new queues.

6. The system of claim 5, wherein if said first predetermined bit in said value of said function applied to said destination name has said second value, then a first value of a second predetermined bit in said value of said function applied to said destination name indicates said target queue is a first one of said additional new queues, and a second value of said second predetermined bit in said value of said function applied to said destination name indicates said target queue is a second one of said additional new queues.

7. The system of claim 6, said program code stored on said computer readable medium further comprising:
   program code for detecting that both of said additional new queues have become dormant; and
   program code for, responsive to said detecting that said both of said additional new queues have become dormant, re-combining said additional new queues to form a re-combined queue.

8. The system of claim 2, said program code stored on said computer readable medium further comprising:
   program code for detecting that both of said two new queues have become dormant; and
   program code for, responsive to said detecting that said both of said two new queues have become dormant, re-combining said two new queues to form a re-combined queue.

9. A computer program product, comprising:
   a non-transitory computer readable medium, said computer readable medium having program code stored thereon for improving queue entry processing between a plurality of operation sources and a plurality of operation destinations, said program code comprising:
   program code for detecting a heavily loaded queue stored in said computer readable medium;
   program code for, responsive to said detecting said heavily loaded queue, dynamically splitting said heavily loaded queue into two new queues stored in said computer readable medium; and
   program code for maintaining a delivered order of queued operations on a per-destination basis by
     queuing previously queued operations destined for a first subset of said operation destinations onto a first one of said two new queues in an order in which said previously queued operations destined for said first subset of said operation destinations were previously queued in said heavily loaded queue, and
     queuing previously queued operations destined for a second subset of said operation destinations onto a second of said two new queues in an order in which said previously queued operations destined for said second subset of said operation destinations were previously queued in said heavily loaded queue.

10. The computer program product of claim 9, wherein said program code for maintaining delivered order of queued operations on a per-destination basis further comprises:
    program code for queuing newly received operations destined for said first subset of said operation destinations onto said first one of said two new queues in an order in which said newly received operations destined for said first subset of said operation destinations are received; and
    program code for queuing newly received operations destined for said second subset of said operation destinations onto said second one of said two new queues in an order in which said newly received operations destined for said second subset of said operation destinations are received.

11. The computer program product of claim 10, said program code stored on said computer readable medium further comprising:
    program code for detecting that a first one of said two new queues is heavily loaded;
    program code for, responsive to said detecting that said first one of said two new queues is heavily loaded, dynamically splitting said first one of said two new queues into two additional new queues; and
    program code for maintaining a delivered order of queued operations on a per-destination basis by
      queuing previously queued operations from said first one of said two new queues and destined for a third subset of said operation destinations onto a first one of said additional new queues in an order in which said previously queued operations destined for said third subset of said operation destinations were previously queued in said first one of said two new queues, and
      queuing previously queued operations from said first one of said two new queues and destined for a fourth subset of said operation destinations onto a second of said additional new queues in an order in which said previously queued operations destined for said fourth subset of said operation destinations were previously queued in said first one of said two new queues.

12. The computer program product of claim 11, wherein said program code for maintaining delivered order of queued operations on a per-destination basis further comprises:
    program code for queuing newly received operations destined for said third subset of said operation destinations onto said first one of said additional new queues in an order in which said newly received operations destined for said third subset of said operation destinations are received; and
    program code for queuing newly received operations destined for said fourth subset of said operation destinations onto said second one of said additional new queues in an order in which said newly received operations destined for said fourth subset of said operation destinations are received.

13. The computer program product of claim 12, said program code stored on said computer readable medium further comprising:
    program code for applying a function to a destination name associated with at least one operation to determine a target queue onto which to enqueue said at least one operation, wherein a first value of a first predetermined bit in a value of said function applied to said destination name indicates said target queue is a second one of said two new queues, and wherein a second value of said first predetermined bit in said value of said function applied to said destination name indicates said target queue is one of said additional new queues.

14. The computer program product of claim 13, wherein if said first predetermined bit in said value of said function applied to said destination name has said second value, then a first value of a second predetermined bit in said value of said function applied to said destination name indicates said target queue is a first one of said additional new queues, and a second value of said second predetermined bit in said value of said function applied to said destination name indicates said target queue is a second one of said additional new queues.

15. The computer program product of claim 14, said program code stored on said computer readable medium further comprising:
   program code for detecting that both of said additional new queues have become dormant; and
   program code for, responsive to said detecting that said both of said additional new queues have become dormant, re-combining said additional new queues to form a re-combined queue.

16. The computer program product of claim 10, said program code stored on said computer readable medium further comprising:
   program code for detecting that both of said two new queues have become dormant; and
   program code for, responsive to said detecting that said both of said two new queues have become dormant, re-combining said two new queues to form a re-combined queue.

17. A system including at least one processor communicably coupled to a non-transitory computer readable medium, said computer readable medium having program code stored thereon for improving queue entry processing between a plurality of operation sources and a plurality of operation destinations, comprising:

means for detecting a heavily loaded queue stored in said computer readable medium;

means for, responsive to said detecting said heavily loaded queue, dynamically splitting said heavily loaded queue into two new queues stored in said computer readable medium; and means for maintaining a delivered order of queued operations on a per-destination basis by
   queuing previously queued operations destined for a first subset of said operation destinations onto a first one of said two new queues in an order in which said previously queued operations destined for said first subset of said operation destinations were previously queued in said heavily loaded queue, and
   queuing previously queued operations destined for a second subset of said operation destinations onto a second of said two new queues in an order in which said previously queued operations destined for said second subset of said operation destinations were previously queued in said heavily loaded queue.

* * * * *